United States Patent
Rhee et al.

(10) Patent No.: US 9,418,041 B2
(45) Date of Patent: Aug. 16, 2016

(54) SAMPLE PROCESS ORDERING FOR DFT OPERATIONS

(71) Applicant: QUALCOMM Incorporated, San Diego, CA (US)

(72) Inventors: Samuel Sangmin Rhee, Irvine, CA (US); Hung-Chih Lai, San Diego, CA (US); Dong Wook Seo, San Diego, CA (US); Raheel Khan, Tustin, CA (US)

(73) Assignee: QUALCOMM Incorporated, San Diego, CA (US)

( * ) Notice: Subject to any disclaimer, the term of this patent is extended or adjusted under 35 U.S.C. 154(b) by 452 days.

(21) Appl. No.: 14/157,441

(22) Filed: Jan. 16, 2014

(65) Prior Publication Data

US 2015/0199299 A1    Jul. 16, 2015

(51) Int. Cl.
*G06F 9/00* (2006.01)
*G06F 15/78* (2006.01)
*G06F 9/30* (2006.01)
*G06F 17/14* (2006.01)
*G06F 9/38* (2006.01)

(52) U.S. Cl.
CPC ............ *G06F 15/78* (2013.01); *G06F 9/30036* (2013.01); *G06F 9/3885* (2013.01); *G06F 17/14* (2013.01)

(58) Field of Classification Search
CPC .............................. G06F 17/14; G06F 9/30036
See application file for complete search history.

(56) References Cited

U.S. PATENT DOCUMENTS

| | | | |
|---|---|---|---|
| 4,477,878 A | * | 10/1984 | Cope ...................... G06F 17/142 708/405 |
| 5,513,366 A | | 4/1996 | Agarwal et al. |
| 7,627,735 B2 | | 12/2009 | Espasa et al. |
| 7,640,284 B1 | | 12/2009 | Goodnight et al. |
| 8,051,239 B2 | | 11/2011 | Nieminen |
| 8,090,896 B2 | | 1/2012 | Nieminen |
| 8,375,196 B2 | | 2/2013 | Bjoerklund et al. |
| 2010/0191791 A1 | * | 7/2010 | Patel .................... G06F 17/142 708/401 |
| 2012/0159130 A1 | | 6/2012 | Smelyanskiy et al. |

FOREIGN PATENT DOCUMENTS

WO    9843180 A1    10/1998

OTHER PUBLICATIONS

International Search Report and Written Opinion—PCT/US2015/011653—ISA/EPO—Jul. 27, 2015.
Jarvinen T., "Systematic Methods for Designing Stride Permutation Interconnections", PhD Thesis, Nov. 19, 2004, pp. 1-147, XP055201981, Tampere, Retrieved from the Internet: URL: https://dspace.cc.tut.fi/dpub/bitstream/handle/123456789/60/jarvinen.pdf?sequence=1 [retrieved on Jul. 13, 2015] pp. 5, 8, 47, 54-61 and 85.

* cited by examiner

*Primary Examiner* — Zachary K Huson
(74) *Attorney, Agent, or Firm* — Loza & Loza LLP

(57) ABSTRACT

Systems and method for reading data samples in reverse group order are described herein according to various embodiments of the present disclosure. In one embodiment, a method for reading data samples in a memory is provided, wherein the data samples correspond to an operand of a vector operation, the data samples are grouped into a plurality of different groups, and the different groups are spaced apart by a plurality of addresses in the memory. The method comprises reading the groups of data samples in reverse group order, and, for each group, reading the data samples in the group in forward order.

28 Claims, 10 Drawing Sheets

FIG. 2

| Operand A | Operand B | Operand C |
|---|---|---|
| 0 | 12 | 24 |
| 1 | 13 | 25 |
| 2 | 14 | 26 |
| 3 | 15 | 27 |
| 4 | 16 | 28 |
| 5 | 17 | 29 |
| 6 | 18 | 30 |
| 7 | 19 | 31 |
| 8 | 20 | 32 |
| 9 | 21 | 33 |
| 10 | 22 | 34 |
| 11 | 23 | 35 |
| 36 | 48 | 60 |
| 37 | 49 | 61 |
| 38 | 50 | 62 |
| 39 | 51 | 63 |
| 40 | 52 | 64 |
| 41 | 53 | 65 |
| 42 | 54 | 66 |
| 43 | 55 | 67 |
| 44 | 56 | 68 |
| 45 | 57 | 69 |
| 46 | 58 | 70 |
| 47 | 59 | 71 |
| 72 | 84 | 96 |
| 73 | 85 | 97 |
| 74 | 86 | 98 |
| 75 | 87 | 99 |
| 76 | 88 | 100 |
| 77 | 89 | 101 |
| 78 | 90 | 102 |
| 79 | 91 | 103 |
| 80 | 92 | 104 |
| 81 | 93 | 105 |
| 82 | 94 | 106 |
| 83 | 95 | 107 |

310-1, 310-2, 310-3

| Operand A | Operand B | Operand C |
|---|---|---|
| 0 | 36 | 72 |
| 1 | 37 | 73 |
| 2 | 38 | 74 |
| 3 | 39 | 75 |
| 4 | 40 | 76 |
| 5 | 41 | 77 |
| 6 | 42 | 78 |
| 7 | 43 | 79 |
| 8 | 44 | 80 |
| 9 | 45 | 81 |
| 10 | 46 | 82 |
| 11 | 47 | 83 |
| 12 | 48 | 84 |
| 13 | 49 | 85 |
| 14 | 50 | 86 |
| 15 | 51 | 87 |
| 16 | 52 | 88 |
| 17 | 53 | 89 |
| 18 | 54 | 90 |
| 19 | 55 | 91 |
| 20 | 56 | 92 |
| 21 | 57 | 93 |
| 22 | 58 | 94 |
| 23 | 59 | 95 |
| 24 | 60 | 96 |
| 25 | 61 | 97 |
| 26 | 62 | 98 |
| 27 | 63 | 99 |
| 28 | 64 | 100 |
| 29 | 65 | 101 |
| 30 | 66 | 102 |
| 31 | 67 | 103 |
| 32 | 68 | 104 |
| 33 | 69 | 105 |
| 34 | 70 | 106 |
| 35 | 71 | 107 |

FIG. 4B

| Operand A | Operand B | Operand C |
|---|---|---|
| 0 | 4 | 8 |
| 1 | 5 | 9 |
| 2 | 6 | 10 |
| 3 | 7 | 11 |
| 12 | 16 | 20 |
| 13 | 17 | 21 |
| 14 | 18 | 22 |
| 15 | 19 | 23 |
| 24 | 28 | 32 |
| 25 | 29 | 33 |
| 26 | 30 | 34 |
| 27 | 31 | 35 |
| 36 | 40 | 44 |
| 37 | 41 | 45 |
| 38 | 42 | 46 |
| 39 | 43 | 47 |
| 48 | 52 | 56 |
| 49 | 53 | 57 |
| 50 | 54 | 58 |
| 51 | 55 | 59 |
| 60 | 64 | 68 |
| 61 | 65 | 69 |
| 62 | 66 | 70 |
| 63 | 67 | 71 |
| 72 | 76 | 80 |
| 73 | 77 | 81 |
| 74 | 78 | 82 |
| 75 | 79 | 83 |
| 84 | 88 | 92 |
| 85 | 89 | 93 |
| 86 | 90 | 94 |
| 87 | 91 | 95 |
| 96 | 100 | 104 |
| 97 | 101 | 105 |
| 98 | 102 | 106 |
| 99 | 103 | 107 |

| DFT size | Decomposition | Strides | | | | |
|---|---|---|---|---|---|---|
| | | DFT3 stage0 | DFT3 stage1 | DFT3 stage2 | DFT3 stage3 | DFT3 stage4 |
| 108 | 3x3x3x2x2 | 36 | 12 | 4 | | |
| 180 | 5x3x3x2x2 | 12 | 4 | | | |
| 324 | 3x3x3x3x2x2 | 108 | 36 | 12 | 4 | |
| 540 | 5x3x3x3x2x2 | 36 | 12 | 4 | | |
| 900 | 5x5x3x3x2x2 | 12 | 4 | | | |
| 972 | 3x3x3x3x3x2x2 | 324 | 108 | 36 | 12 | 4 |

▨ Memory Access Conflict

FIG. 6

SAMPLE PROCESS ORDERING FOR DFT OPERATIONS

BACKGROUND

1. Field

Aspects of the present disclosure relate generally to sample process ordering, and more particularly, to sample process ordering for Discrete Fourier Transform (DFT) operations.

2. Background

A vector processor may be used to accelerate processing of baseband signals (e.g., in a wireless device) by performing arithmetic and logic operations on data vectors, in which each data vector comprises a plurality of data samples. A vector processor may be programed to perform various vector operations including Discrete Fourier Transform (DFT) operations (e.g., for Single Carrier Frequency Division Multiple Access (SD-FDMA) modulation), correlation operations, filtering operations, etc.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

According to an aspect, a method for reading data samples in a memory is described herein. The data samples correspond to an operand of a vector operation, the data samples are grouped into a plurality of different groups, and the different groups are spaced apart by a plurality of addresses in the memory. The method comprises reading the groups of data samples in reverse group order, and, for each group, reading the data samples in the group in forward order.

A second aspect relates to an apparatus for reading data samples in a memory. The data samples correspond to an operand of a vector operation, the data samples are grouped into a plurality of different groups, and the different groups are spaced apart by a plurality of addresses in the memory. The apparatus comprises means for reading the groups of data samples in reverse group order, and means for reading the data samples in each group in forward order.

A third aspect relates to an apparatus. The apparatus comprises an address generator configured to generate a plurality of addresses, wherein the generated addresses correspond to addresses of data samples in a memory, the data samples correspond to an operand of a vector operation, the data samples are grouped into a plurality of different groups, and the different groups are spaced apart by a plurality of addresses in the memory. The apparatus also comprises a memory interface configured to read the groups of data samples in reverse group order based on the generated addresses.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the described embodiments are intended to include all such aspects and their equivalents.

BRIEF DESCRIPTION OF THE DRAWINGS

FIG. 2 shows a vector register according to an embodiment of the present disclosure.

FIG. 4B shows an example of memory access conflicts caused by reading the samples in FIG. 4A in forward group order.

FIG. 5 shows an example of samples input to a third DFT3 stage of a 108-point DFT.

FIG. 6 is a table showing an example of properties of DFTs of different sizes.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Figure 1:
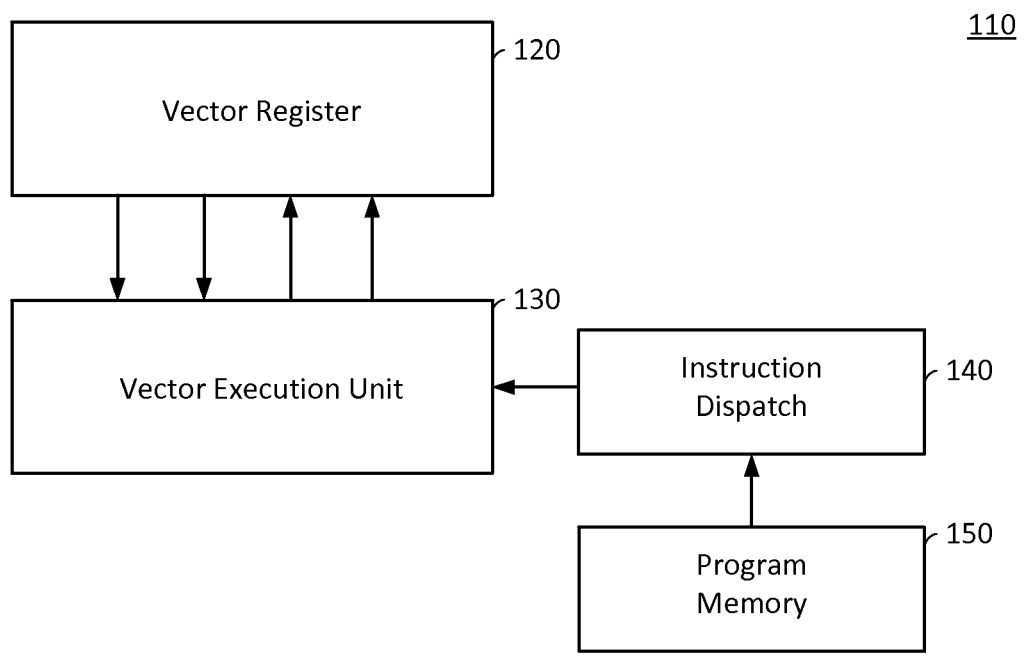
FIG. 1 is a block diagram of a vector processor.

A vector processor may be used to accelerate processing of baseband signals by performing arithmetic and logic operations on data vectors, in which each data vector comprises a plurality of data samples. FIG. 1 shows an example of a vector processor 110 comprising a vector register 120, a vector execution unit 130, an instruction dispatch circuit 140, and program memory 150. The vector execution unit 130 comprises reconfigurable data paths, logic and arithmetic devices (e.g., adders, multiplexers, accumulators) that can be configured (programmed) to perform various vector operations on data vectors.

During operation, data vectors that need to be processed by the vector processor 110 are loaded into the vector register 120. The instruction dispatch circuit 140 fetches one or more instructions from the program memory 150 and loads the instructions into the vector execution unit 130 to program the vector execution unit 130 to perform one or more vector operations. The vector execution unit 130 then reads a data vector from the vector register 120 and performs the vector operations on the data vector. The vector execution unit 130 may store the results of the vector operations in the vector register 120.

Figure 2:
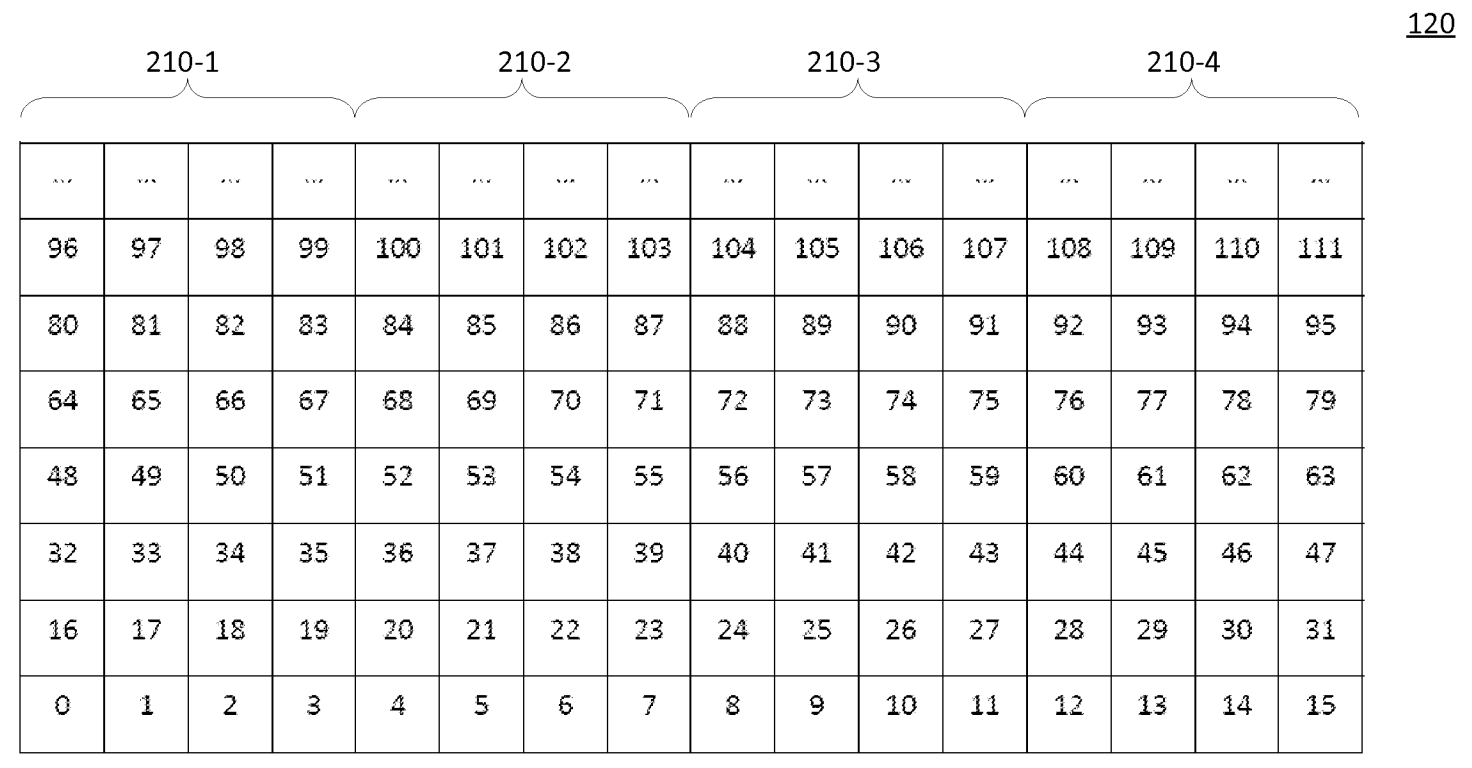

FIG. 2 shows the vector register 120 according to one embodiment. In this embodiment, the vector register 120 has a width of 16 data samples, where each sample may comprise 32 bits for a width of 512 bits. The vector register 120 is divided into four banks 210-1 to 201-4, where each bank has a width of four samples. The samples may be stored in the vector register 120 in linear order, as shown in FIG. 2. It is to be appreciated that the numerical designations in FIG. 2 indicate the addresses of the samples in the vector register 120, and not the values of the samples.

In one aspect, samples are read in non-linear order with stride, where the stride is a multiple of four. Therefore, in this aspect, the vector register 120 essentially needs to be four-sample addressable. For ease of discussion, embodiments of the present disclosure are discussed below using the example of a four-bank vector register that is four-sample addressable. However, it is to be appreciated that the number of banks can be four, eight, sixteen or other number of banks, as long as the vector register is capable of four-sample addressing.

During one clock cycle, the vector execution unit 130 may read 16 data samples from the vector register 120, in which only a single row of samples can be read from each bank 210-1 to 210-4. However, the rows for the different banks 210-1 to 210-4 do not have to correspond to the same row of the vector register 120. For example, during one clock cycle, the vector execution unit 130 may read samples 0-3 from bank 210-1 and read samples 40-43 from bank 210-3, where samples 0-3 and samples 40-43 are in different rows of the vector register 120. A memory access conflict occurs when the vector execution unit 130 attempts to read samples from different rows within the same bank during the same clock cycle. For example, a memory access conflict occurs if the vector execution unit 130 attempts to read samples 0-3 and samples 16-19 from bank 210-1 during the same clock cycle. In general, a memory access conflict occurs when the vector execution unit 130 attempts to read samples in overlapping rows during the same clock cycle.

The vector execution unit 130 may be programmed to perform a Discrete Fourier Transform (DFT) on a data vector, in which the DFT converts time-domain samples in the data vector into frequency-domain samples. The vector execution unit 130 may perform DFTs for SD-FDMA modulation. Other applications of DFTs include spectral analysis, filtering, data compression, etc. For DFT operations, the vector execution unit 130 does not always read and process samples in linear order, as discussed further below.

The vector execution unit 130 may perform long-point DFTs of various sizes. For example, the vector execution unit 130 may be programmed to perform any one of a 108-point DFT, a 180-point DFT, a 324-point DFT, a 540-point DFT, a 900-point DFT, and a 972-point DFT, just to name a few. To make the computation of a long-point DFT more manageable, the vector execution unit 130 may perform the long-point DFT over a plurality of cascaded stages, in which 2-point DFTs (DFT2s), 3-point DFTs (DFT3s) or 5-point DFTs (DFT5s) are performed in each stage.

For example, the vector execution unit 130 may perform a 108-point DFT over five stages, in which DFT3s are performed in each of the first three stages and DFT2s are performed in each of the last two stages (i.e., 3×3×3×2×2=108). The example of the 108-point DFT will now be described in further detail to illustrate the problem of memory access conflicts, although it is to be appreciated that memory access conflicts are also a problem for DFTs of other sizes.

Figures 3, 4A:
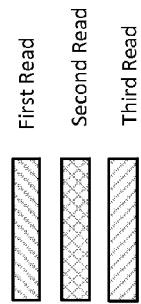
FIG. 3 shows an example of samples input to a first DFT3 stage of a 108-point DFT.
FIG. 4A shows an example of samples input to a second DFT3 stage of a 108-point DFT.

FIG. 3 shows the samples (samples 0-107) that are input to the vector execution unit 130 in the first stage. It is to be appreciated that the numerical designation for each sample in FIG. 3 indicates the address of the sample in the vector register 120, and not the value of the sample.

The input samples are divided into three operands: operand A, operand B and operand C. Operand A includes samples 0-35, operand B includes samples 36-71, and operand C includes samples 72-107. Each row in FIG. 3 corresponds to a set of three samples. Each set of samples comprises a sample corresponding to operand A, a sample corresponding to operand B, and a sample corresponding to operand C, in which the stride (gap) between the samples in the set is 36. For example, the first set (first row in FIG. 3) includes sample 0 for operand A, sample 36 for operand B, and sample 72 for operand C, the second set includes sample 1 for operand A, sample 37 for operand B, and sample 73 for operand C, and so on.

In the first stage, the vector execution unit 130 performs a DFT3 on each set of samples. For example, the vector execution unit 130 performs a DFT3 on samples 0, 36 and 72 in the first set, a DFT3 on samples 1, 37 and 73 in the second set, and so on. Each DFT3 (also referred to as a radix-3 operation) may be performed by multiplying the respective set of samples by a 3×3 twiddle matrix as follows:

$$\begin{bmatrix} X_0 \\ X_1 \\ X_2 \end{bmatrix} = \begin{bmatrix} W_0 & W_3 & W_6 \\ W_1 & W_4 & W_7 \\ W_2 & W_5 & W_8 \end{bmatrix} \begin{bmatrix} x_0 \\ x_1 \\ x_2 \end{bmatrix} \quad (1)$$

where $x_0$ to $x_2$ are the input samples, $X_0$ to $X_2$ are the output samples, and $W_0$ to $W_8$ are twiddle factors. The vector execution unit 130 may perform some or all of the DFT3s (radix-3 operations) in parallel using rows of multipliers and adders.

After performing the DFT3s, the vector execution unit 130 stores the resulting output samples in the vector register 120 for the next stage. For example, the vector execution unit 130 may replace the inputs samples for the first stage with the output samples from the DFT3s in the first state. The output samples may be used as the input samples for the second stage.

To perform DFT3s in the first stage, the vector execution unit 130 needs to read the samples for the different operands from the vector register 120. For example, the vector execution unit 130 may read the samples corresponding to operand A in ascending order, in which samples 0-15 are read during a first read operation for operand A, samples 16-31 are read during a second read operation for operand A, and samples 32-35 are read during a third read operation for operand A. In this example, the read operations do not result in a memory access conflict. In other words, each read operation does not involve reading samples in overlapping rows of the vector register 120. This is because the samples are read continuously in linear order.

FIG. 4A shows the samples that are input to the vector execution unit 130 in the second stage. As discussed above, the samples input to the second stage may be the output samples from the first stage.

For the second stage, the samples are grouped into three groups 310-1 to 310-3, in which each group includes 36 samples. Samples 0-35 are grouped into a first one of the groups 310-1, samples 36-71 are grouped into a second one of the groups 310-2, and samples 72-107 are grouped into a third one of the groups 310-3. For each group 310-1 to 310-3, the first twelve samples in the group correspond to operand A, the next twelve samples in the group correspond to operand B, and the remaining twelve samples in the group correspond to operand C. For example, in the first group 310-1, samples 0-11 correspond to operand A, samples 12-23 correspond to operand B and samples 24-35 correspond to operand C. In FIG. 4A, the stride between the samples in each set (row in FIG. 4A) is 12. In this case, the stride is a multiple of four and not a multiple of eight.

As shown in FIG. 4A, the samples corresponding to each operand are not continuous across group boundaries. For example, when the samples corresponding to operand A transition from the first group 310-1 to the second group 310-2, a discontinuity in the samples occurs (i.e., the samples jump from sample 11 to sample 36). At each group transition, the sample address increases by two times the stride.

For each operand, the vector execution unit 130 may read the samples for the operand in forward group order. In this regard, FIG. 4A shows an example in which the vector execution unit 130 attempts to read the samples corresponding to operand A over several read operations in forward group order starting with sample 0 in the first group 310-1. In a first read operation, the vector execution unit 130 attempts to read samples 0-11 and 36-39, in a second read operation, the vector execution unit 130 attempts to read samples 40-47 and sample 72-79, and in a third read operation, the vector execution unit 130 attempts to read samples 80-83.

Figure 4B:
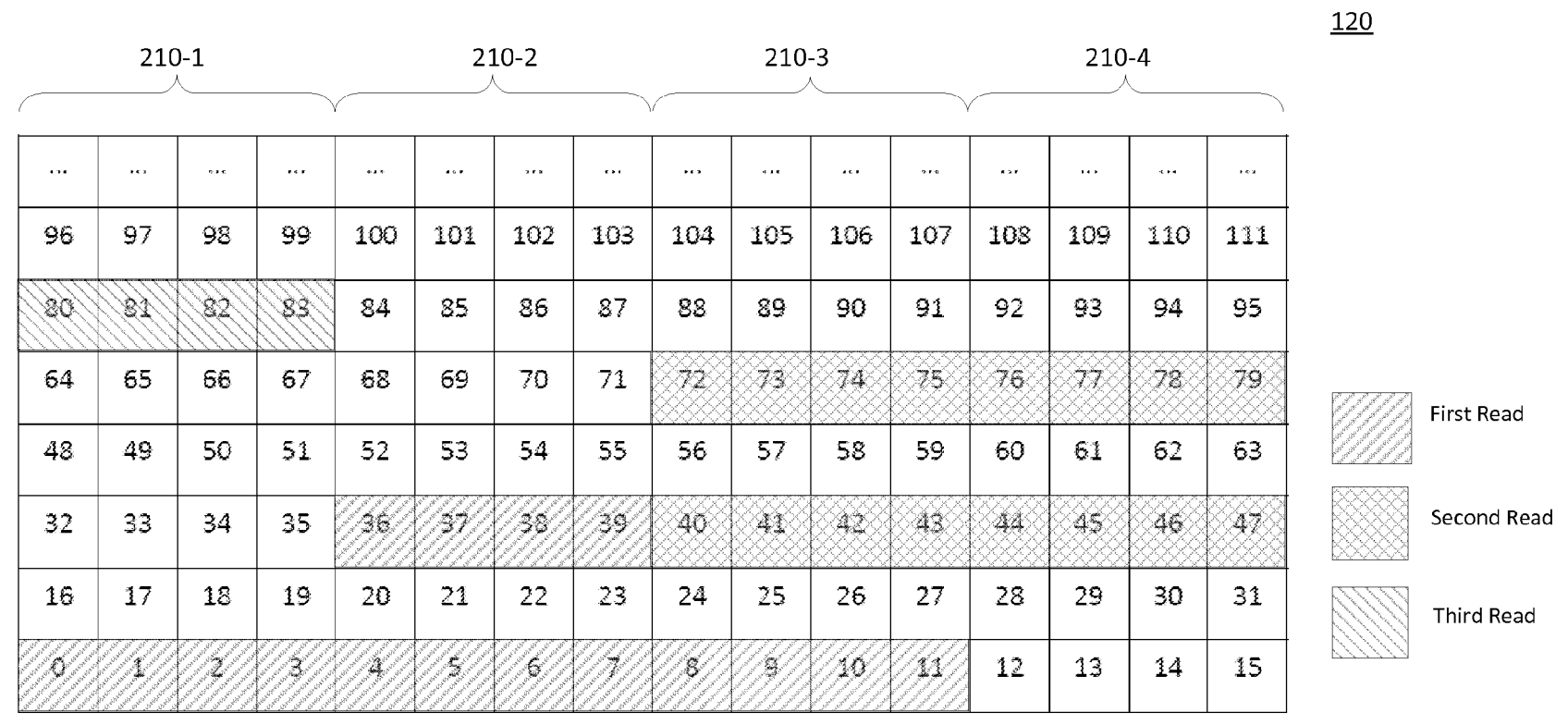

As shown in FIG. 4A, in the first read operation, the vector execution unit 130 attempts to read samples 0-11 from the first group 310-1 and samples 36-39 from the second group 310-2 for a total of 16 samples. However, this read operation results in a memory access conflict, which is illustrated in FIG. 4B. The read operation attempts to read samples from two different rows (i.e., overlapping rows) within bank 210-2 in one clock cycle. More particularly, the read operation attempts to read samples 4-7 in one row within bank 210-2 and samples 36-39 in another row within bank 210-2. As a result, the first read operation cannot be performed in one clock cycle, thereby decreasing throughput. Fundamentally, the memory access conflict is due to the fact that the number of samples that are skipped at each group transition is not a multiple of the width of the vector register 120 (e.g., 16). When a number of samples equal to the width of the vector register 120 (e.g., 16 samples) are read in linear order with only one discontinuity point, the address gap at the discontinuity point needs to be a multiple of the register width (e.g., 16 samples) to avoid memory access conflict. The second read operation also results in a memory access conflict by attempting to read samples from two different rows within banks 210-3 and 210-4 in the same clock cycle, as shown in FIG. 4B. It can be demonstrated that reading the samples for each of the other operands in forward group order also leads to memory access conflicts by following the above analysis for each of the other operands.

FIG. 5 shows the samples that are input to the vector execution unit 130 in the third stage. The samples input to the third stage may be the output samples from the second stage.

For the third stage, the samples are grouped into nine groups 510-1 to 510-9, in which each group includes 12 samples. For each group 510-1 to 510-9, the first four samples in the group correspond to operand A, the next four samples in the group correspond to operand B, and the remaining four samples in the group correspond to operand C, in which the stride between the samples in each set (row in FIG. 5) is 4. As shown in FIG. 5, the samples corresponding to each operand are not continuous across group boundaries. For example, when the samples corresponding to operand A transition from the first group 510-1 to the second group 510-2, a discontinuity in the samples occurs (i.e., the samples jump from sample 3 to sample 12). At each group transition, the sample address increases by two times the stride.

To perform DFT3s in the third stage, the vector execution unit 130 may read the samples corresponding to operand A in forward group order, in which samples 0-3, 12-15, 24-27 and 36-39 are read during a first read operation for operand A, samples 48-51, 60-63, 72-75 and 84-87 are read during a second read operation for operand A, and samples 96-99 are read during a third read operation for operand A. In this example, the read operations do not result in a memory access conflict (i.e., each read operation does not involve reading samples in overlapping rows of the vector register 120). For the third DFT3 stage, the stride is four and eight sample addresses are skipped at each discontinuity point for an operand. The third DFT3 stage differs from the other DFT3 stages in that each group contains only four samples per operand. As a result, since the staring samples before and after a discontinuity point are not aligned on the same column of the vector register 120, there will not be an access memory conflict.

For each DFT3 stage after the first DFT3 stage, the DFT3 stage may have three times the number of groups as the previous DFT3 stage, ⅓ the number of samples per group as the previous DFTs stage, and ⅓ the stride of the previous DFT3 stage. For example, the third DFT3 stage has nine groups, 12 samples per group and a stride of 4 while the second DFT3 stage (previous DFT3 stage) has three groups, 36 samples per group and a stride of 12.

Thus, for the example of the 108-point DFT, memory access conflicts are a problem in the second DFT3 stage. However, it is to be appreciated that memory access conflicts are not limited to the example discussed above. Memory access conflicts are also a problem for DFTs of other sizes, and therefore need to be addressed for DFTs of other sizes as well.

In this regard, FIG. 6 is a table showing various properties for a 108-point DFT, a 180-point DFT, a 324-point DFT, a 540-point DFT, a 900-point DFT, and a 972-point DFT. As shown in FIG. 6, each long-point DFT can be decomposed into a plurality of cascaded stages. For example, the 180-point DFT can be decomposed into five stages comprising one DFT5 stage, two DFT3 stages, and two DFT2 stages (i.e., 5×3×3×2×2=180). For each long-point DFT, FIG. 6 shows the stride for each DFT3 stage, and in which DFT3 stage memory access conflicts occur. For example, for the 180-point DFT, memory access conflicts occur in the first DFT3 stage. For the 972-point DFT, memory access conflicts occur in the second, third and fourth DFT3 stages. Thus, FIG. 6 shows that memory access conflicts are a problem for DFTs of various sizes.

There are several approaches for avoiding memory access conflicts. In one approach, the vector execution unit 130 may read samples from the vector register 120 in an order specified by an address lookup table, in which the order does not result in memory access conflicts. In this approach, the vector execution unit 130 may need to consult different address lookup tables to read samples for different DFT sizes and/or stages. This approach has several drawbacks. First, storing the address lookup tables takes up valuable space. As the size of a DFT increases, the size of the corresponding address lookup table increases, and hence the space taken up by the corresponding address lookup table.

In another approach, the vector register 120 may be configured so that two or more rows of samples can be read from a bank at a time. However, this approach increases the area of the vector register 120 and complicates address generation logic by requiring, among other things, additional read ports on the vector register 120 to read from two or more rows from a bank at a time.

Embodiments of the present disclosure prevent memory access conflicts by reading samples for each operand in reverse group order instead of forward group order. As discussed further below, reverse group ordering according to various embodiments can be implemented using an algorithm without the need for address lookup tables, thereby saving area. Further, implementing reverse group ordering according to various embodiments only requires making minor changes to logic used for forward group ordering.

Figure 7A:
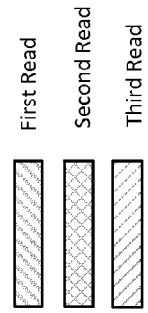
FIG. 7A shows an example of samples input to a second DFT3 stage of a 108-point DFT according to an embodiment of the present disclosure.

FIG. 7A shows an embodiment of the present disclosure in which the vector execution unit 130 reads the samples corresponding to operand A in the second DFT3 stage of a 108-point DFT. In this embodiment, the vector execution unit 130 reads the samples for operand A in reverse (descending) group order starting with the third group 310-3 (last group). For each group, the vector execution unit 130 reads the samples within the group in forward order (ascending order), same as before.

Figure 7B:
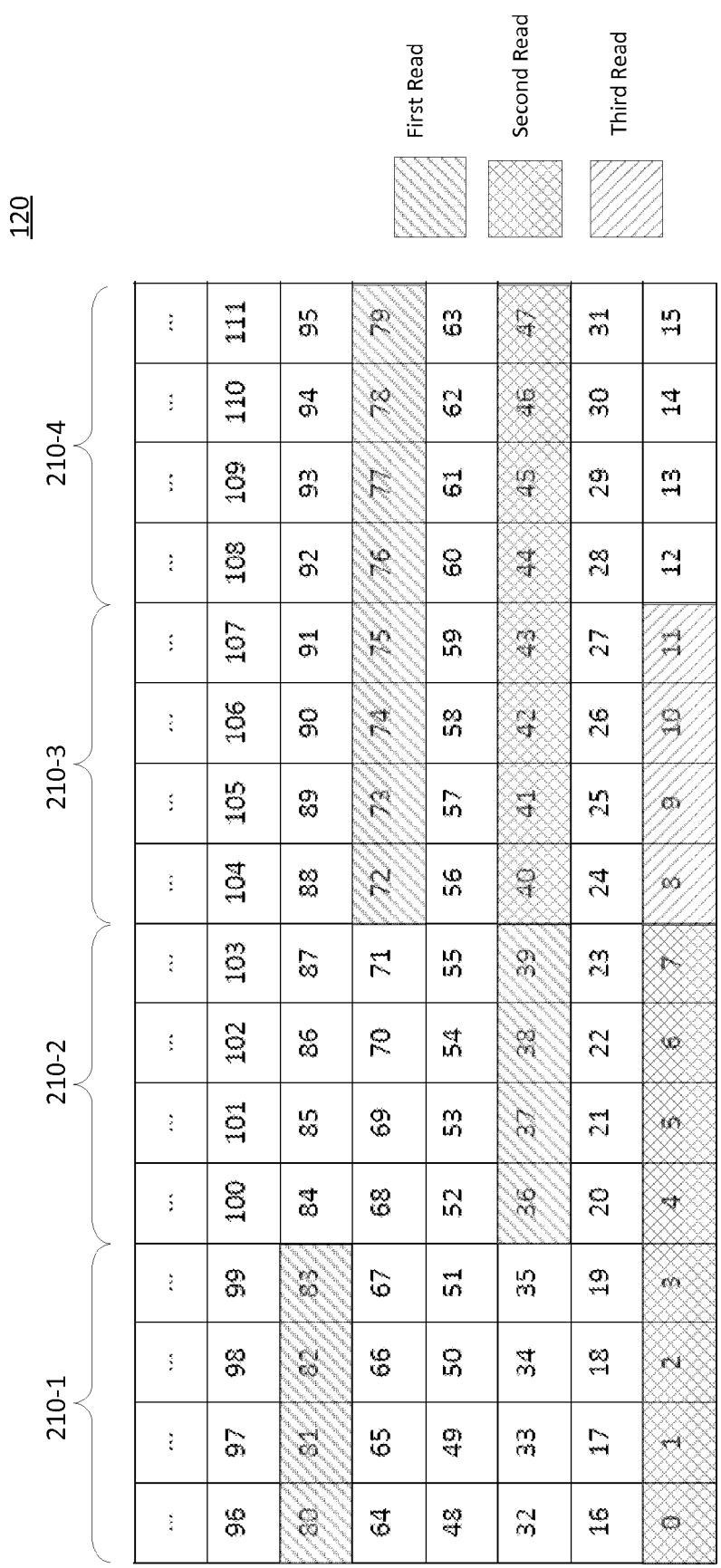
FIG. 7B shows an example in which memory access conflicts are avoided by reading the samples in FIG. 7A in reverse group order according to an embodiment of the present disclosure.

In a first read operation for operand A, the vector execution unit 130 reads samples 72-83 from the third group 310-1 (last group) in forward order and samples 36-39 from the second group 310-2 (next to last group) in forward order for a total of 16 samples. This read operation does not result in a memory access conflict, which is illustrated in FIG. 7B. This is because the read operation reads a single row from each bank 210-1 to 201-4. As a result, the first read operation can be performed in one clock cycle, thereby achieving maximum throughput. One reason there is no access memory conflict is that the discontinuity in the samples during the first read operation (i.e., jump from sample 83 to sample 36) is two times the space between groups 310-1 to 310-3 (e.g., 2×24=48), which is a multiple of the width of the vector register 120 (e.g., 16). In contrast, the discontinuity in the samples for forward group ordering is equal to the space between groups 310-1 to 310-3 (e.g., 24), which is not a multiple of the width of the vector resister 120. In general, reverse group ordering succeeds where forward group ordering fails when the space between groups is not a multiple of the vector register width (e.g., 16), but two times the space between groups is a multiple of the vector register width.

In a second read operation for operand A, the vector execution unit 130 reads samples 40-47 from the second group 310-2 in forward order and samples 0-7 from the first group 310-1 in forward order for a total of 16 samples. This read operation also does not result in a memory access conflict, which is illustrated in FIG. 7B. This is because the read operation reads a single row from each bank 210-1 to 201-4. It can be shown that reading the samples for each of the other operands in reverse group order avoids memory access conflicts by following the above analysis for each of the other operands.

Thus, reading the samples in reverse group order avoids memory access conflicts associated with reading the samples in forward group order. Although reverse group order is discussed above using the example of a 108-point DFT, it is to be appreciated that reverse group ordering can also be used to avoid memory access conflicts for other DFT sizes and/or stages (e.g. any one of the DFT sizes and/or stages shown in FIG. 6). It is also to be appreciated that reverse group ordering may also be performed for a DFT3 stage that does not suffer from memory access conflicts. For example, reverse group ordering may be performed for all DFT3 stages of a long-point DFT without having to switch between forward group ordering and reverse group ordering, thereby simplifying address generation logic.

It is to be appreciated that the read operations for operand A are not necessarily performed consecutively. For example, the vector execution unit 130 may read 16 sets of samples by reading 16 samples for operand A (e.g., samples 72-83 and 36-39), 16 samples for operand B (e.g., samples 84-95 and 48-51) and 16 samples for operand C (e.g., samples 96-107 and 60-63) in separate read operations. The vector execution 130 may perform 16 DFTs (16 radix-3 operations) on the 16 sets of samples to obtain 16 sets of output samples. After completing the DFT3s for the 16 sets of samples, the vector execution 130 may proceed with reading and processing the next 16 sets of samples in a similar manner. Thus, the vector execution unit 130 may read and process 16 sets of samples at a time in this example.

An advantage of reverse group ordering is that it can be described by a general equation, which can be applied to different DFT sizes and/or stages. This allows the vector execution unit 130 to implement the reverse group ordering for read operations using an algorithm without the need for address lookup tables, thereby saving area. Also, reverse group ordering may be implemented by making only minor modifications to an algorithm used for forward group ordering. This may be demonstrated by examining the following pseudo code for implementing forward group ordering for a DFT3 stage:

```
for (int m=0; m < (size/3); m++)
    {
        if ( m = = stride*(n+1))
        {
            n = n + 1;
        }
        address_A_forward[m] = (2*n)*stride + m;
        address_B_forward[m] = (2*n)*stride + m + stride;
        address_C_forward[m] = (2*n)*stride + m + 2*stride
    }
``` where m is an address counter, size is the corresponding DFT size, stride is the stride of the DFT3 stage, n is a group counter, address_A_forward[m] is a read address for operand A, address_B_forward[m] is a read address for operand B, and address_C_forward[m] is a read address for operand C. The group counter n is initially set to zero.

For the example of the second DFT3 stage of a 108-point DFT, the size equals 108 and the stride equals 12. In this example, the for loop in the algorithm is performed 36 times, in which the sample counter m starts at zero, increments by one in each iteration, and ends at 35.

For m=0 to m=stride-1 (11), the addresses output by the algorithm for operand A are 0-11. For example, for m=0, the address is 0 (i.e., (2*0)*12+0=0) For m=stride (12) to m=2*stride-1 (23), the group counter n is incremented to one, and the addresses output by the algorithm for operand A are 36-47. For example, for m=stride (12), the address is 36 (i.e., (2*1)*12+12=36). For m=2*stride (24) to m=35, the group counter n is incremented to two, and the addresses output by the algorithm for operand A are 72-83. For example for m=2*stride (24), the address is 72 (i.e., (2*2)*12+24=72). Thus, in this example, the algorithm outputs addresses 0-11, 36-47 and 72-83 for operand A, which matches FIG. 4A. Note that each time the group counter n is incremented, the addresses jump by two times the stride.

The addresses output by the algorithm for operand B are equal to the corresponding addresses for operand A plus the stride (12). Thus, in this example, the algorithm outputs addresses 12-23, 48-59 and 84-95 for operand B, which matches FIG. 4A. The addresses output by the algorithm for operand C are equal to the corresponding addresses for operand A plus two times the stride (24). Thus, in this example, the algorithm outputs addresses 24-35, 60-71 and 96-107 for operand C, which matches FIG. 4A.

An algorithm for reverse group ordering for an DFT3 stage may be implemented by modifying the above code for forward group ordering to the following:

```
for (int m=0; m < (size/3); m++)
    {
        if ( m = = stride*(n+1))
        {
          n = n + 1;
        }
            address_A_forward[m] = (3*max−4*n)*stride + m;
            address_B_forward[m] = (3*max−4*n)*stride + m +
            stride;
            address_C_forward[m] = (3*max−4*n)*stride + m +
            2*stride
    }
``` where max is a maximum group parameter and is equal to the number of groups in the DFT3 stage minus one. For the example of the DFT3 stage comprising three groups shown in FIG. 7A, max is equal to two. As can be seen above, the algorithm for forward group ordering is modified to perform reverse group ordering by changing the term (2*n) in the address generation equations for operands A, B and C to (3*max−4*n).

For m=0 to m=stride-1 (11), the addresses output by the algorithm for operand A are 72-83. For example, for m=0, the address is 72 (i.e., (3*2−4*0)*12+0=72). For m=stride (12) to m=2*stride-1 (23), the group counter n is incremented to one, and the addresses output by the algorithm for operand A are 36-47. For example, for m=stride (12), the address is 36 (i.e., (3*2−4*1)*12+12=36). For m=2*stride (24) to m=35, the group counter n is incremented to two, and the addresses output by the algorithm for operand A are 0-11. For example for m=2*stride (24), the address is 0 (i.e., (3*2−4*2)*12+ 24=0). Thus, in this example, the algorithm outputs addresses 72-83, 36-47 and 0-11 for operand A, which matches FIG. 7A.

The addresses output by the algorithm for operand B are equal to the corresponding addresses for operand A plus the stride (12). Thus, in this example, the algorithm outputs addresses 84-95, 48-59 and 12-23 for operand B, which matches FIG. 7A. The addresses output by the algorithm for operand C are equal to the corresponding addresses for operand A plus two times the stride (24). Thus, in this example, the algorithm outputs addresses 96-107, 60-71 and 24-35 for operand C, which matches FIG. 7A.

Therefore, an algorithm for reverse group ordering may be implemented by making minor changes to an algorithm for forward group ordering. As a result, implementing reverse group ordering requires little to no increase in the complexity of logic used for address generation. The algorithm for reverse group ordering may be implemented in software or hardware, as discussed further below.

It is to be appreciated that the algorithm for reverse group ordering is not limited to the second DFT3 stage of a 108-point DFT, and may be applied to other DFT sizes and/or stages by adjusting the size and stride parameters in the algorithm accordingly. Thus, the algorithm for reverse group ordering is a general algorithm that can be applied to various DFT sizes and/or stages.

Reverse group ordering only requires minor changes to the logic used for twiddle factor generation for forward group ordering. This is because, when the order in which the samples are read and processed is changed to implement reverse group ordering, the order of the corresponding twiddle factors only needs to be changed in a similar manner so that each set of samples is multiplied by the same twiddle matrix.

Figure 8:
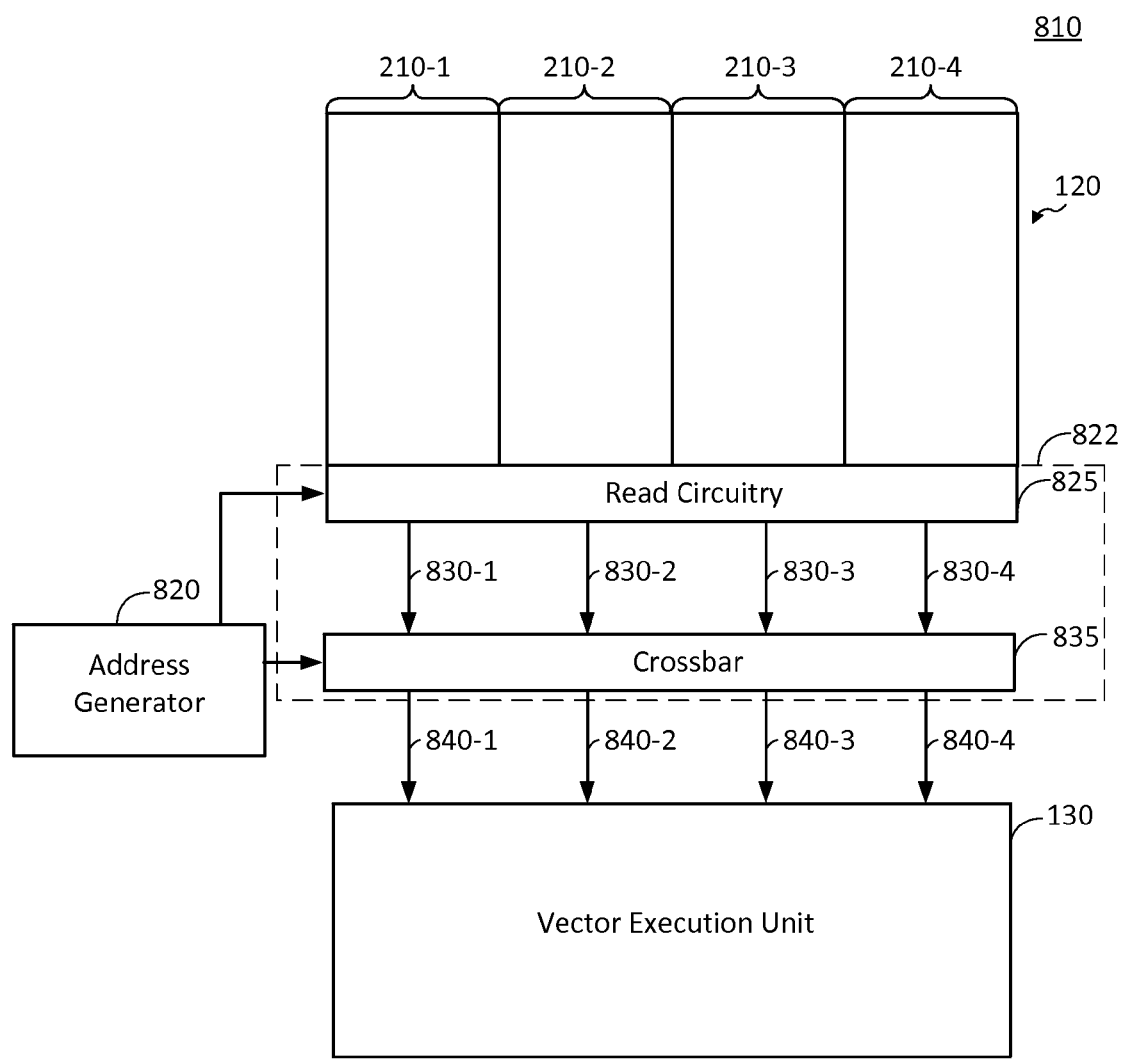
FIG. 8 shows a vector processor implementing reverse group ordering according to an embodiment of the present disclosure.

FIG. 8 shows a vector processor 810 for implementing reverse group ordering according to embodiment of the present disclosure. The vector processor 810 includes the vector register 120, the vector execution unit 130, an address generator 820, and a memory interface 822. The memory interface 822 comprises read circuitry 825, a crossbar 835, and a first plurality of data paths 830-1 to 830-4 coupled between the read circuitry 825 and the crossbar 835. Each of the data paths 830-1 to 830-4 corresponds to one of the banks 210-1 to 210-4 in the vector register 120.

The address generator 820 is configured to generate sample addresses according to an algorithm for implementing reverse group ordering, and to output a control signal to the memory interface 822 based on the generated addresses. The memory interface 822 is configured to read data samples from the vector register 120 in reverse group order based on the control signal.

For each read operation, the read circuitry 825 in the memory interface 822 is configured to read a row of samples from each bank 210-1 to 210-4 of the vector register 120 based on the control signal, and output each row of read samples to a corresponding one of the data paths 830-1 to 830-4. The crossbar 835 in the memory interface 822 is configured to receive the rows of samples from the data paths 830-1 to 830-4, reorder the rows of samples based on the control signal, and output the reordered rows of samples to the vector execution unit 130 via data paths 840-1 to 840-4.

Operation of the vector processor 810 will now be described in more detail with reference to the example shown in FIGS. 7A and 7B. For the first read operation for operand A, the address generator 820 generates addresses 72-83 and 36-39 corresponding to samples 72-83 and 36-39. The address generator 820 then outputs a control signal to the read circuitry 825 based on the generated addresses, causing the read circuitry 825 to read the samples corresponding to the generated addresses from the vector register 120. The samples are read from four rows in the vector register 120, in which each row is within a different bank 210-1 to 201-4 of the vector register 120. In this example, the read circuitry 825 reads samples 80-83 from bank 210-1, samples 36-39 from bank 210-2, samples 72-75 from bank 210-3, and samples 76-79 from bank 210-4, as shown in FIG. 7B.

The read circuitry 825 then outputs each row of samples to the corresponding data path 830-1 to 830-4. For example, the read circuitry 825 outputs samples 80-83 read from bank 201-1 to data path 830-1, outputs samples 36-39 read from bank 210-2 to the data path 830-2, and so on. The crossbar 835 receives the rows of samples from data paths 830-1 to 830-4, and reorders the rows of samples to place the samples in the desired order for input to the vector execution unit 130. In this example, the crossbar 835 reorders the rows of samples 80-83, 36-39, 72-75 and 76-79 from data paths 830-1, 830-2, 830-3 and 830-4, respectively, to obtain the desired sample order 72-83 and 36-39 shown in FIG. 7A. To do this, the crossbar 835 reroutes samples 72-75 from data path 830-3 to data path 840-1, reroutes samples 76-79 from data path 830-4 to data path 840-2, reroutes samples 80-83 from data path 830-1 to data path 840-3, and reroutes samples 36-39 from data path 830-2 to data path 840-4. As a result, the samples are input to the vector execution unit 130 in the desired order.

Figure 9:
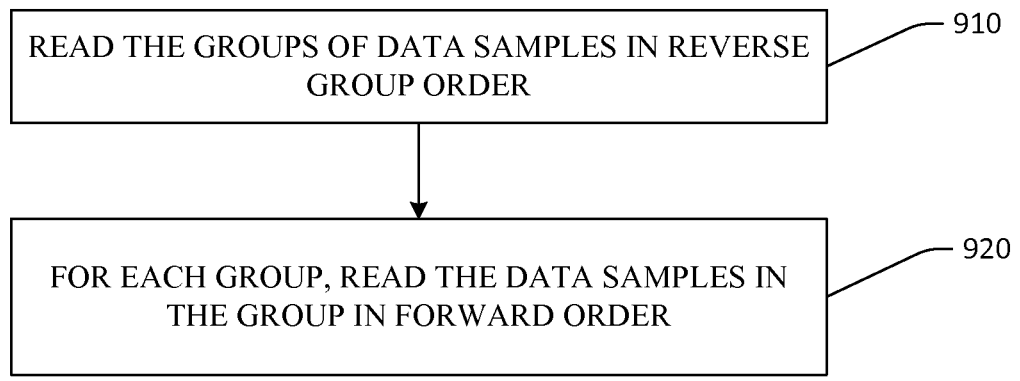
FIG. 9 is a flow diagram illustrating a method for reading samples in reverse group order according to an embodiment of the present disclosure.

FIG. 9 shows a method 900 for reading samples in reverse group order according to an embodiment of the present disclosure. The data samples are stored in a memory (e.g., the vector register 120) and correspond to an operand of a vector operation (e.g., operand A of a DFT3 stage). The data samples are grouped into a plurality of different groups (e.g., groups 310-1 to 310-3), and the different groups are spaced apart by a plurality of addresses (e.g., two times the stride) in the memory. The method 900 comprises the steps set forth below.

In step 910, the groups of data samples are read in reverse group order. For example, the vector execution unit 130 may read the groups (e.g., groups 310-1 to 310-3) in descending order starting with the last group (e.g., group 310-3) and finishing with the first group (e.g., group 310-1).

In step 920, for each group, the data samples in the group are read in forward order. For example, the vector unit 130 may read the samples (e.g., samples 72-83) in the last group (e.g., group 310-3) in forward order (ascending order), read the samples (e.g., samples 36-47) in the next-to-last group (e.g., group 310-2) in forward order, and so forth until the samples (e.g., samples 0-11) in the first group (e.g., group 310-1) are read in forward order. It is to be appreciated that steps 910 and 920 may be performed concurrently.

Those skilled in the art will appreciate that the various illustrative blocks, and steps described in connection with the disclosure herein may be implemented as electronic hardware, computer software, or combinations of both. To clearly illustrate this interchangeability of hardware and software, various illustrative components, blocks, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative blocks described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, 'microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection may be properly termed a computer-readable medium to the extent involving non-transient storage of transmitted signals. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium, to the extent the signal is retained in the transmission chain on a storage medium or device memory for any non-transient length of time. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples described herein but is to be accorded the widest scope consistent with the principles and novel features disclosed herein.

What is claimed is:

1. A method for reading data samples in a memory, wherein the data samples correspond to an operand of a vector operation, the data samples are grouped into a plurality of different groups, and the different groups are spaced apart by a plurality of addresses in the memory, the method comprising:

reading the groups of data samples in reverse group order; and for each group, reading the data samples in the group in forward order.

2. The method of claim 1, wherein the vector operation comprises a plurality of Discrete Fourier Transforms (DFTs).

3. The method of claim 2, wherein each of the DFTs comprises a three-point DFT, and the operand is one of three operands for the three-point DFTs.

4. The method of claim 1, wherein a number of addresses between adjacent groups in the plurality of groups is not a multiple of a width of the memory, and two times the number of addresses between adjacent groups is a multiple of the width of the memory.

5. The method of claim 4, wherein the space between the different groups in the memory corresponds to a value equal to two times a stride.

6. The method of claim 5, wherein the stride is a multiple of four and not a multiple of eight.

7. The method of claim 4, wherein the width of the memory corresponds to 16 samples.

8. The method of claim 1, wherein reading the data samples in each group comprises reading, in a single read operation, the data samples in one of the groups and a portion of the data samples in another one of the groups.

9. The method of claim 1, wherein reading the data samples in each group comprises reading a row of data samples from each one of a plurality of banks in the memory, wherein each row comprises a portion of the data samples in the group.

10. The method of claim 9, further comprising, for each group:
   reordering the rows of data samples for the group; and
   inputting the reordered rows of data samples for the group to a vector execution unit.

11. An apparatus for reading data samples in a memory, wherein the data samples correspond to an operand of a vector operation, the data samples are grouped into a plurality of different groups, and the different groups are spaced apart by a plurality of addresses in the memory, the apparatus comprising:
   means for reading the groups of data samples in reverse group order; and
   means for reading the data samples in each group in forward order.

12. The apparatus of claim 11, wherein the vector operation comprises a plurality of Discrete Fourier Transforms (DFTs).

13. The apparatus of claim 12, wherein each of the DFTs comprises a three-point DFT, and the operand is one of three operands for the three-point DFTs.

14. The apparatus of claim 11, wherein a number of addresses between adjacent groups in the plurality of groups is not a multiple of a width of the memory, and two times the number of addresses between adjacent groups is a multiple of the width of the memory.

15. The apparatus of claim 14, wherein the space between the different groups in the memory corresponds to a value equal to two times a stride.

16. The apparatus of claim 15, wherein the stride is a multiple of four and not a multiple of eight.

17. The apparatus of claim 14, wherein the width of the memory corresponds to 16 samples.

18. The apparatus of claim 11, wherein the means for reading the data samples in each group comprises means for reading, in a single read operation, the data samples in one of the groups and a portion of the data samples in another one of the groups.

19. The apparatus of claim 11, wherein the means for reading the data samples in each group comprises means for reading a row of data samples from each one of a plurality of banks in the memory, wherein each row comprises a portion of the data samples in the group.

20. The apparatus of claim 19, further comprising:
   means for reordering the rows of data samples for each group; and
   means for inputting the reordered rows of data samples for each group to a vector execution unit.

21. An apparatus, comprising:
   an address generator configured to generate a plurality of addresses, wherein the generated addresses correspond to addresses of data samples in a memory, the data samples correspond to an operand of a vector operation, the data samples are grouped into a plurality of different groups, and the different groups are spaced apart by a plurality of addresses in the memory; and
   a memory interface configured to read the groups of data samples in reverse group order based on the generated addresses.

22. The apparatus of claim 21, wherein the vector operation comprises a plurality of Discrete Fourier Transforms (DFTs).

23. The apparatus of claim 22, wherein each of the DFTs comprises a three-point DFT, and the operand is one of three operands for the three-point DFTs.

24. The apparatus of claim 21, wherein a number of addresses between adjacent groups in the plurality of groups is not a multiple of a width of the memory, and two times the number of addresses between adjacent groups is a multiple of the width of the memory.

25. The apparatus of claim 24, wherein the space between the different groups in the memory corresponds to a value equal to two times a stride.

26. The apparatus of claim 25, wherein the stride is a multiple of four and not a multiple of eight.

27. The apparatus of claim 24, wherein the width of the memory corresponds to 16 samples.

28. The apparatus of claim 21, wherein the memory interface further comprises:
   read circuitry configured to read, for each group, a row of data samples from each one of a plurality of banks in the memory, wherein each row comprises a portion of the data samples in the group; and
   a crossbar configured to reorder the rows of data samples for each group.

* * * * *